United States Patent

Burtis

[11] 3,768,843
[45] Oct. 30, 1973

[54] TUBING COUPLING
[75] Inventor: Wilson A. Burtis, Westminster, Calif.
[73] Assignee: Delaval Turbine California Inc., Princeton, N.J.
[22] Filed: Jan. 5, 1972
[21] Appl. No.: 215,456

Related U.S. Application Data
[63] Continuation-in-part of Ser. No. 2,470, Jan. 13, 1970, Pat. No. 3,647,246.

[52] U.S. Cl. ............... 285/114, 285/226, 285/301, 285/415
[51] Int. Cl. ........................................... F16l 55/00
[58] Field of Search ............... 285/109, 114, 226, 285/227, 229, 126, 299, 300, 301, 414, 415, 419, 233

[56] References Cited
UNITED STATES PATENTS
| 1,242,568 | 10/1917 | Loughridge | 285/415 X |
| 2,081,021 | 5/1937 | Smith et al. | 285/415 X |
| 2,793,883 | 5/1957 | Main | 285/229 |
| 2,898,940 | 8/1959 | Cole | 285/114 X |
| 3,084,957 | 4/1963 | Caldwell | 285/301 X |
| 3,456,965 | 7/1969 | Gajewski et al. | 285/419 X |
| 3,647,246 | 7/1972 | Burtis | 285/114 |

Primary Examiner—Jordan Franklin
Assistant Examiner—Wayne L. Shedd
Attorney—William C. Babcock

[57] ABSTRACT

A coupling of flexible structure for removably connecting the adjacent, generally axially aligned ends of two lengths of tubing, which tubing end portions have transverse, circumferentially extending, outwardly projecting beads formed thereon. The coupling includes a tubular flexible connector that effects primary seals with resilient rings that encircle said end portions, and the rings in turn being in sealing engagement with said beads. A flexible spring loaded cable removably engages slotted portions of ferrules that form a part of the coupling to prevent longitudinal separation of the ferrules and without axially loading the connector beyond the extent necessary to maintain an effective seal.

The coupling includes longitudinally split, generally cylindrical adapters that permit the coupling to be used to removably connect end portions of tubing that already have beads formed therein. The adapters used must, of course, conform to the external surface configuration of the already formed end portions of the tubing. Thus, the coupling may be used on tubing having beaded end portions that were initially intended to be connected by a flexible hose and associated clamps. By varying the thickness of the adapters tubing of various diameters may be connected by use of the same coupling.

8 Claims, 3 Drawing Figures

Patented Oct. 30, 1973

3,768,843

INVENTOR.
WILSON A. BURTIS
BY
William G. Babcock
ATTORNEY

TUBING COUPLING

CROSS REFERENCE TO RELATED APPLICATION

This present application is a continuation-in-part of my copending application filed Jan. 13, 1970, under Ser. No. 2,470, entitled "Tubing Coupling and Flaring Tool for Use Therewith," now U.S. Pat. No. 3,647,246, issued Mar. 7, 1972.

BACKGROUND OF THE INVENTION

1. Field of the Invention

Tubing Coupling.

2. Description of the Prior Art

In the past, it has been common practice to use a length of flexible hose with associated clamps to connect two longitudinally spaced end portions of tubing. The tubing end portions normally have transverse, circumferentially extending beads formed as an integral part thereof. The beads sealingly engage interior surface portions of the hose.

Such connections have several operational disadvantages. The hose tends to deteriorate when exposed to hot gases or hot air, and has a relatively short life. Also, the hose will permanently deform when subjected to the pressure of the clamps, and accordingly the clamps must be periodically tightened if the hose is to continue to sealingly connect the end portions of the tubing.

The primary purpose in devising the present invention is to supply a light-weight coupling of simple mechanical structure that is particularly adaptable for replacing prior art connections, and without cutting or otherwise altering the structure of the end portions of the tubing previously connected by the hose.

A further purpose in devising the present invention is to supply a flexible connector that overcomes certain operational disadvantages of prior art connectors, in that the present invention does not deteriorate appreciably under normal usage, nor does it require periodic inspection and adjustment to function properly.

Yet another purpose in devising the present invention is to furnish a connector with associated adapters that permit the same coupling to be used on tubing of various external diameters.

SUMMARY OF THE INVENTION

A flexible coupling for connecting adjacent end portions of tubing that have been formed to include transverse, circumferentially extending, outwardly projecting beads such as are used when the end portions are to be connected by a length of hose.

The coupling includes two ring-shaped ferrules and a tubular connector. The ferrules encircle multi-piece cylindrical adapter assemblies that extend around the exterior end portions of the tubing and conform to the particular configuration thereof. Two resilient rings that are in sealing engagement with the beads also sealingly engage the adjacent end portions of the connector. The end portions of the connector span the adjacent free ends of the adapters and at least parts of the adjacent free ends of the ferrules. The ferrules are slotted and are removably engaged by a pliable tensioned cable to permit a desired degree of compression to be placed on the flexible connector. The ferrules are removably held in encircling positions on the adapters by snap rings that engage circumferentially extending, transversely aligned slots formed in the adapters.

A major object of the present invention is to provide a flexible tubing coupling for removably connecting adjacently disposed end portions of tubing that already have circumferentially extending beads formed thereon, and without cutting or altering the configuration of said end portions.

Another object of the invention is to supply a coupling that may be used to maintain non-leaking communication between the adjacent ends of the two lengths of tubing that may be misaligned or subject to longitudinal or angular movement relative to one another, and the coupling capable of being mounted on the tubing without tools and by persons having little or no specialized knowledge of the coupling art.

A further object of the invention is to furnish a coupling that will fail safe even though the marcelled wire or pliable cable connecting the ferrules should break.

Yet another object of the invention is to supply a tubing coupling in which the surface to surface seals remain in a static sealing position even through there may be substantial flexing or longitudinal deformation of the connector extending between the ferrules.

DESCRIPTION OF THE PREFERRED EMBODIMENT

Figure 3:
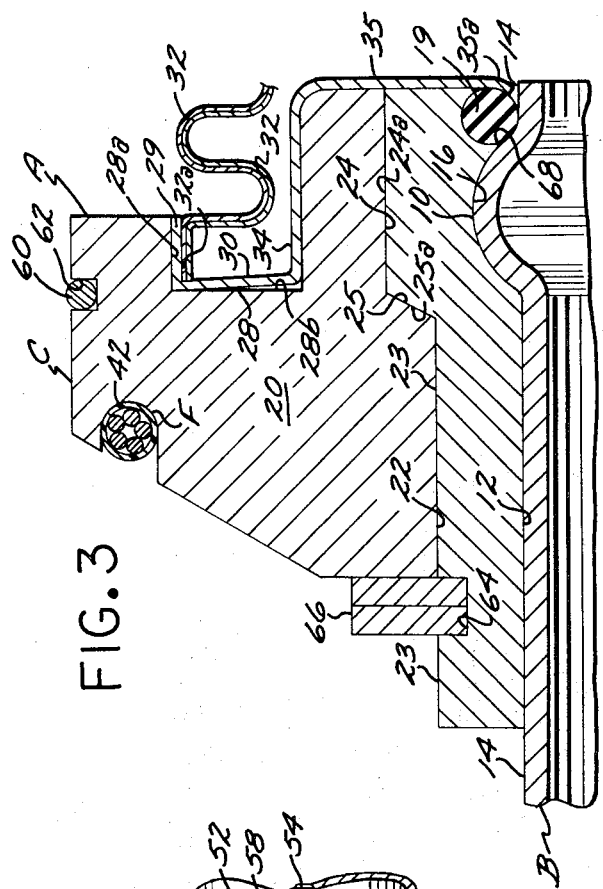
FIG. 3 is an enlarged longitudinal cross-sectional view of a portion of the coupling taken on the line 3—3 of FIG. 2.
Figure 1:
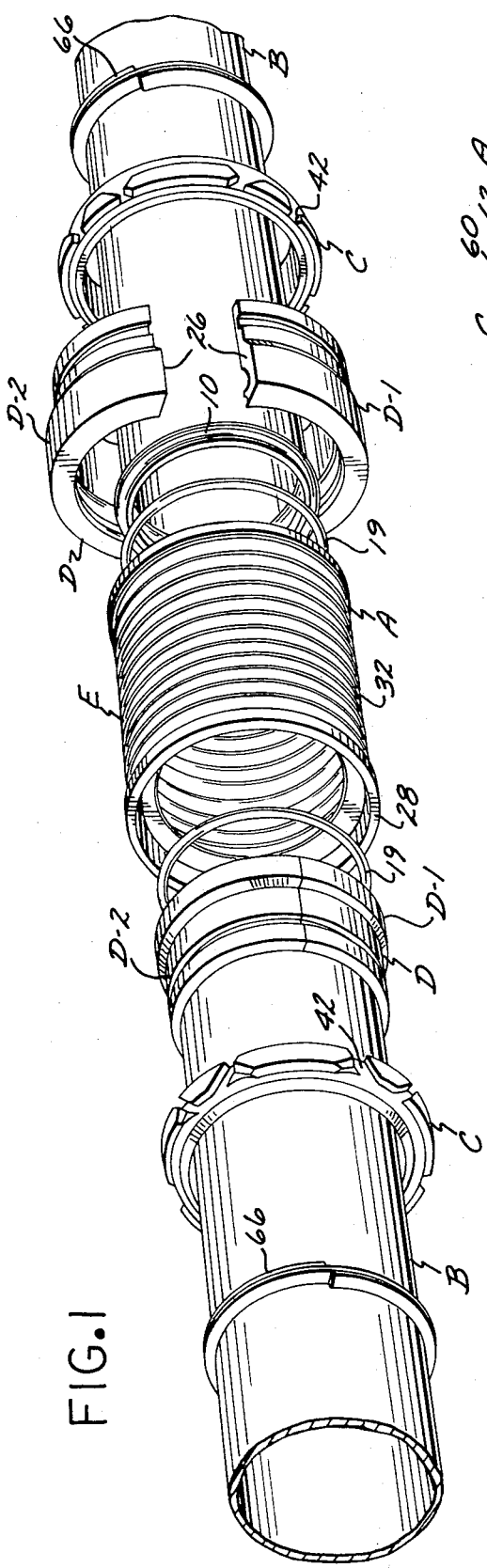
FIG. 1 is an exploded perspective view of the coupling and the beaded end portions of the tubing that it is to connect together.
Figure 2:
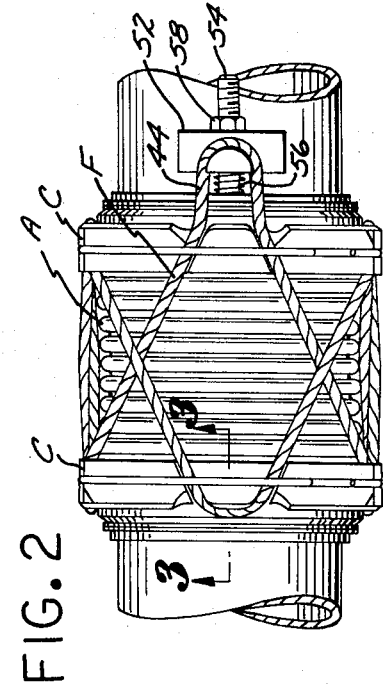
FIG. 2 is a side elevational view of the coupling in a made up condition.

The coupling A, as may best be seen in FIGS. 1 to 3, is adapted to establish a flexible connection between the adjacently disposed end portions of two lengths of tubing B, which end portions have transverse circumferentially extending beads 10 formed thereon. Two longitudinally split cylindrical adapters D are provided that have internal surfaces 12 that conform to the external end surfaces 14 of the tubing B. In FIG. 3 it will be seen that the adapters D have transverse grooves 16 therein that conform to and envelop the beads 10.

A tubular connector E in the form of a resilient bellows extends between first and second ferrules C. The bellows E has inwardly extending end portions, to be described later in detail, that effect primary pressure seals with two resilient O-rings 19, and the O-rings 19, in turn, effect pressure seals with the beads 10, as may best be seen in FIG. 3. Connector E is formed from at least one sheet of a resilient material, and as a result may flex both longitudinally and transversely to permit limited movement of the first and second lengths of tubing relative to one another.

The first and second ferrules are removably connected by a pliable cable F, as shown in FIG. 2, to prevent longitudinal separation of the ferrules, as well as maintain the end portions of the connector E in desired pressure sealing contact with the resilient rings 19.

Each of the ferrules C is defined by a ring-shaped body 20 that has a bore 22 extending longitudinally therethrough. Each bore 22 is of such diameter as to slidably and snuggly engage the exterior surface 23 of one of the adapters D as shown in FIG. 3. The bodies 20 have circumferentially extending recesses 24 therein that extend outwardly from bores 22.

Each ferrule C has an interior, transverse, circumferentially extending body shoulder 25 that extends between bore 22 and recess 24. Each adapter D includes at least two longitudinally split segments D-1 and D-2 that are shown in and exploded position in the right-hand portion of FIG. 1. The body shoulders 25 taper in such directions that the segments D-1 and D-2 tend to have the surfaces 25 thereof forced into greater pressure contact as the first and second ferrules C are forced towards one another by increasing the tension on cable F.

The adapter sections D-1 and D-2, when the surfaces 26 thereof are in abutting contact, as shown to the left of FIG. 1, and cooperate to define a generally cylindrical adapter D that has at least a portion of the surface 23 in snug engagement with the surface of a ferrule C that defines the bore 22. Each adapter D when assembled as shown in FIGS. 1 and 3, has external circumferentially extending surfaces 24a and 25a that are in abutting contact with surfaces 24 and 25 of one of the adapters C.

Connector E, as may best be seen in FIG. 3, includes two circular end sections 28 that are partially disposed in circular recesses 28a formed in the ferrules C. Each section 28 includes a cylindrical flange 29 that is bonded by conventional means to a cylindrical end portion 32a of the bellows 32. The bellows 32 may be formed from a single sheet of resilient material, or two abutting sheets 32, as illustrated in FIG. 3. The interior sheet 32 may have physical characteristics different from those of the exterior sheet. Thus, the interior sheet 32 may be of a material that is highly resistant to corrosion from the fluids flowing through the coupling A.

Each flange 29 has a resilient wall 30 that extends inwardly therefrom, with the wall tapering to the extend that it is slightly spaced from the surface 28b of ferrule C. The walls 30 of the two end portions 28 of the bellows taper towards one another. Both of the walls 30 develop on their inner ends into cylindrical shells 34 that develop on their inner ends into ring-shaped members 35 that overlie the inner end surfaces of the ferrules C and adapters D. Members 35 have slightly curved free end portions 35a that are in pressure sealing contact with O-rings 19.

The ferrules C, as shown in FIG. 2, have a number of angularly disposed, circumferentially spaced slots 42 therein that are engaged by an endless loop of pliable cable F. The cable F is laced into the slots 42 in a criss-cross pattern and defines a sequence of figure 8's as the cable extends around the ferrules C. The cable F is tensioned sufficiently to maintain member portions 35a in desired pressure sealing contact with the O-rings 19, and the O-rings in turn being in sealing contact with the tubing surfaces 14 and beads 10.

Uniform tension may be maintained on cable F by causing a loop 44 thereof to removably engage a slotted block 52 that is slidably mounted on a threaded rod 54 that extends outwardly from either the first or second ferrule C, as shown in FIG. 2. A compressed helical spring 56 encircles rod 54 and has the abutting ends thereof in contact with the rod-supporting ferrule C and block 52. Rod 54 is engaged by a nut 58 that adjustably limits the outward positioning of block 52 relative to the rod-supporting ferrule C. By adjusting nut 58 on rod 54 the tension on cable F may be increased or decreased, and the pressure sealing contact between member surfaces 35a and O-rings 19 controlled.

Split, resilient rings 60 are provided that are seated in circumferential grooves 62 defined in the ferrules C. The snap rings 60 overlie portions of the cable F, and prevent the latter from being inadvertently displaced from the slots 42.

Adapters D, as shown in the drawing, are formed with circumferentially extending grooves 64 in which snap rings 66 are removably mounted. The rings 66 are adjacently disposed to the outer ends of the ferrules C, and prevent inadvertent longitudinal movement of the ferrules away from one another even should the cable F be removed from the coupling.

Although an O-ring has been shown and described as the sealing ring 19, it will be apparent that sealing rings of other than a circular cross section may be used if desired. The O-rings 19 are partially situated in transversely aligned grooves 68 formed in the adapters D. The coupling above described may be used with lengths of tubing B of different external diameters by varying the thickness of the adapters.

The coupling A above described serves the same functions as the adapters described in my copending application Ser. No. 2,470, but differs therefrom in that the end portions of the tubing to be connected need not be flared.

I claim:

1. A coupling for use in connecting first and second axially aligned lengths of tubing having first and second longitudinally spaced end portions on which transverse, circumferentially extending, outwardly projecting first and second beads are defined, said coupling including:

a. first and second longitudinally split, generally cylindrical adapters that have interior surfaces that snugly engage the exterior surfaces of said end portions and said beads, with the adjacent end surfaces of said adapters having circumferential grooves therein that are in communication with at least a part of said beads;

b. first and second resilient sealing rings disposed in said grooves that encircle said first and second end portions, with said rings projecting outwardly from said grooves towards one another;

c. first and second ring-shaped ferrules removably mounted in first fixed positions on said adapters and encircling the latter;

d. a resilient tubular connector of such configuration as to be capable of flexing at least longitudinally, said connector being disposed between said first and second adapters and said first and second ferrules, said connector including first and second inwardly extending end portions that are in abutting contact with said sealing rings; and e. first means for so connecting said ferrules as to axially compress said connector to the extent that said first and second connector end portions pressure- and sealingly engage said sealing rings, and said pressure on said rings forcing the latter into sealing contact with said beads and sections of the interior surface of said adaptors and the external surfaces of said tubing.

2. A coupling as defined in claim 1 in which said connector is of bellows configuration intermediate said end extremities thereof to permit said connector to flex both longitudinally and transversely, and said first means is a pliable elongate member formed into an endless loop that engages a plurality of circumferentially spaced slots formed in the exterior surface of said ferrules to define a succession of figure 8 configurations as said member extends around said bellows, and said member allowing said connector to flex transversely but preventing further longitudinal separation of said ferrules when said lengths of tubing are axially aligned.

3. A coupling as defined in claim 2 which in addition includes:

f. second means for preventing said elongate member being inadvertently displaced from said slots.

4. A coupling as defined in claim 1 in which said first and second adapters have first and second body shoulders defined on the exterior surfaces thereof that act as stops to dispose said ferrules in said first positions when said ferrules are initially moved onto said adapters.

5. A coupling as defined in claim 4 which in addition includes:

f. second means that cooperate with said body shoulders to removably hold said ferrules in said first positions on said adapters.

6. A coupling as defined in claim 1 in which said first and second end portions of said connector extend inwardly over free adjacent end surfaces of said first and second ferrules and first and second adapters before pressure sealing with said first and second resilient rings.

7. a coupling as defined in claim 1 in which the adjacent surfaces of said first and second ferrules have recesses formed therein in which parts of said first and second end portions of said connector are removably disposed.

8. A coupling as defined in claim 5 in which said second means are first and second snap rings that abut against said first and second ferrules and removably engage circumferential grooves formed in said first and second adapters.

* * * * *